(12) United States Patent
Wang et al.

(10) Patent No.: US 8,786,135 B2
(45) Date of Patent: Jul. 22, 2014

(54) WIRELESS ENERGY TRANSFER WITH ANISOTROPIC METAMATERIALS

(75) Inventors: Bingnan Wang, Boston, MA (US);
Koon Hoo Teo, Lexington, MA (US);
William Yerazunis, Acton, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 0 days.

(21) Appl. No.: 13/027,383

(22) Filed: Feb. 15, 2011

(65) Prior Publication Data

US 2012/0038219 A1 Feb. 16, 2012

Related U.S. Application Data

(63) Continuation-in-part of application No. 12/731,544, filed on Mar. 25, 2010.

(51) Int. Cl.
*H04B 5/00* (2006.01)

(52) U.S. Cl.
CPC ....................................... *H04B 5/00* (2013.01)
USPC ........................................................ 307/104

(58) Field of Classification Search
CPC ....... H04B 5/00; H04B 5/0025; H04B 5/0037
USPC ........................................................ 307/104
See application file for complete search history.

(56) References Cited

U.S. PATENT DOCUMENTS

| | | | | |
|---|---|---|---|---|
| 7,218,190 B2 * | 5/2007 | Engheta et al. | ............... | 333/239 |
| 7,420,445 B2 * | 9/2008 | Wyeth et al. | ................... | 333/262 |
| 7,421,178 B2 * | 9/2008 | Podolskiy et al. | ............ | 385/129 |
| 7,561,320 B2 * | 7/2009 | Wang et al. | ................... | 359/238 |
| 7,623,745 B2 * | 11/2009 | Podolskiy et al. | .............. | 385/43 |
| 7,629,941 B2 * | 12/2009 | Pendry et al. | ................. | 343/851 |
| 7,733,289 B2 * | 6/2010 | Pendry et al. | ................. | 343/851 |
| 7,777,594 B2 * | 8/2010 | Eleftheriades | ................ | 333/134 |
| 7,848,026 B2 * | 12/2010 | Chowdhury et al. | ......... | 359/652 |
| 7,952,526 B2 * | 5/2011 | Lee et al. | ............... | 343/700 MS |
| 7,985,965 B2 * | 7/2011 | Barker et al. | ................... | 257/22 |
| 7,994,880 B2 * | 8/2011 | Chen et al. | .................... | 333/219 |
| 8,026,862 B2 * | 9/2011 | Pendry et al. | ................. | 343/851 |
| 8,031,128 B2 * | 10/2011 | Tanielian et al. | ............. | 343/795 |
| 2007/0115540 A1 * | 5/2007 | Bratkovski et al. | .......... | 359/342 |
| 2007/0188385 A1 * | 8/2007 | Hyde et al. | ............. | 343/700 MS |
| 2007/0215843 A1 * | 9/2007 | Soukoulis et al. | ............ | 252/570 |
| 2008/0204327 A1 * | 8/2008 | Lee et al. | ............... | 343/700 MS |
| 2009/0219213 A1 * | 9/2009 | Lee et al. | ............... | 343/700 MS |
| 2010/0027102 A1 * | 2/2010 | Hyde et al. | .................... | 359/333 |

(Continued)

OTHER PUBLICATIONS

Metamaterial-Enhanced Coupling between Magnetic Dipoles for Efficient Wireless Power Transfer, Urzhumov et al, Feb. 11, 2011, Drake University, pp. 1-23; available at http://arxiv.org/PS_cache/arxiv/pdf/1102/1102.2281v1.pdf.*

(Continued)

*Primary Examiner* — Adi Amrany

(74) *Attorney, Agent, or Firm* — Dirk Brinkman; Gene Vinokur

(57) ABSTRACT

A system includes a structure configured to exchange the energy wirelessly via a coupling of evanescent waves and an anisotropic metamaterial arranged within an electromagnetic near-field such that an amplitude of the evanescent waves is increased. The structure is electromagnetic and non-radiative, wherein the structure generates the electromagnetic near-field in response to receiving the energy.

14 Claims, 18 Drawing Sheets

(56) References Cited

U.S. PATENT DOCUMENTS

| | | | |
|---|---|---|---|
| 2010/0033701 A1* | 2/2010 | Lee et al. | 355/67 |
| 2010/0117908 A2* | 5/2010 | Lee et al. | 343/700 MS |
| 2010/0148589 A1* | 6/2010 | Hamam et al. | 307/104 |
| 2010/0277789 A1* | 11/2010 | Wu et al. | 359/276 |
| 2011/0095953 A1* | 4/2011 | Lier | 343/755 |
| 2011/0133565 A1* | 6/2011 | Teo et al. | 307/104 |
| 2011/0133566 A1* | 6/2011 | Teo et al. | 307/104 |
| 2011/0133567 A1* | 6/2011 | Teo et al. | 307/104 |
| 2011/0156486 A1* | 6/2011 | Teo et al. | 307/104 |
| 2011/0156487 A1* | 6/2011 | Teo et al. | 307/104 |
| 2011/0159812 A1* | 6/2011 | Kim et al. | 455/41.1 |
| 2011/0169335 A1* | 7/2011 | Teo et al. | 307/104 |
| 2011/0169336 A1* | 7/2011 | Yerazunis et al. | 307/104 |
| 2011/0234010 A1* | 9/2011 | Bohori et al. | 307/104 |
| 2011/0241438 A1* | 10/2011 | Kim et al. | 307/104 |
| 2011/0241612 A1* | 10/2011 | Ryu et al. | 320/108 |
| 2011/0248570 A1* | 10/2011 | Hong et al. | 307/104 |
| 2011/0248571 A1* | 10/2011 | Kim et al. | 307/104 |
| 2011/0266880 A1* | 11/2011 | Kim et al. | 307/104 |
| 2011/0266881 A1* | 11/2011 | Kim et al. | 307/104 |

OTHER PUBLICATIONS

A New 2D Isotropic Left-Handed Metamaterial Design: Theory and Experiment, Marques et al, May 31, 2002, Microwave and Optical Technology Letters, vol. 35, No. 5, Dec. 5, 2002. Availalbe at http://personal.us.es/marques/3-A-new-2-D.pdf.*

Shen et al, "Compact planar far-field superlens based on anisotropic left-handed metamaterials", Sep. 24, 2009, American Physical Society Physical Review B 80, 115123, pp. 1-9. Available at http://prb.aps.org/pdf/PRB/v80/i11/e115123.*

Smith et al, "Design and measurement of anisotropic metamaterials that exhibit negative refraction", Mar. 2004, Duke University, IEICE Trans. Electron, vol. E87-C, No. 3. pp. 359-370. Available at http://people.ee.duke.edu/~drsmith/pubs_smith_group/smith_ieice_2004.pdf.*

* cited by examiner

| Structure | Even | Odd | Coupling coefficient |
|---|---|---|---|
| Cylinder Only | 7.49595e7 | 7.49717e7 | 3.88e4 |
| Cylinder plus Lossless NIM | 7.49511e7 | 7.497625e7 | 7.60e4 |
| Cylinder plus Lossless NIM pair | 7.5145785e7 | 7.5175227e7 | 14.8e4 |

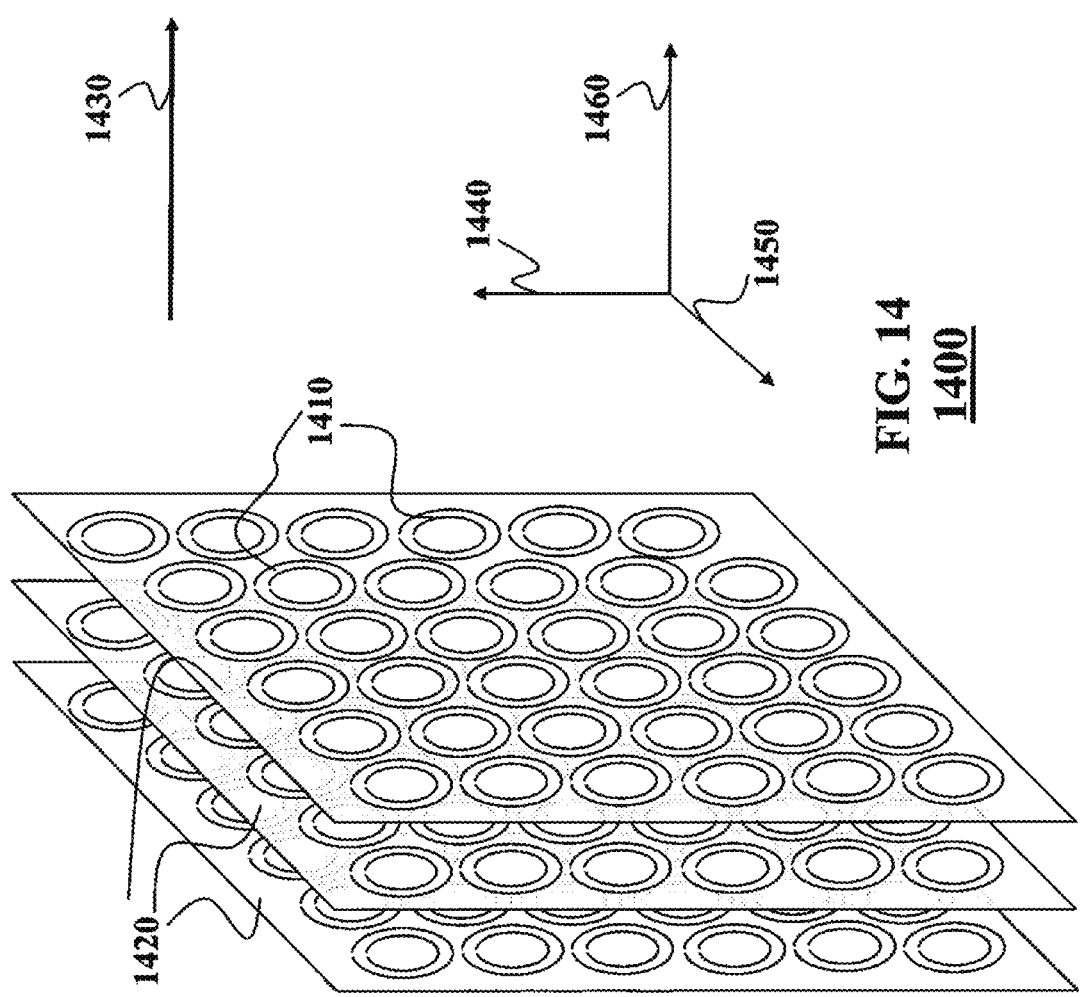

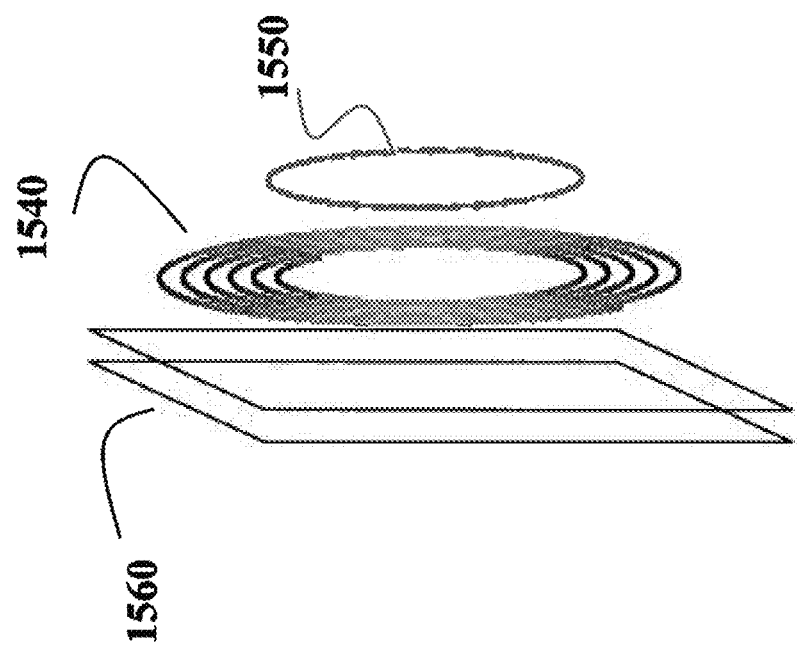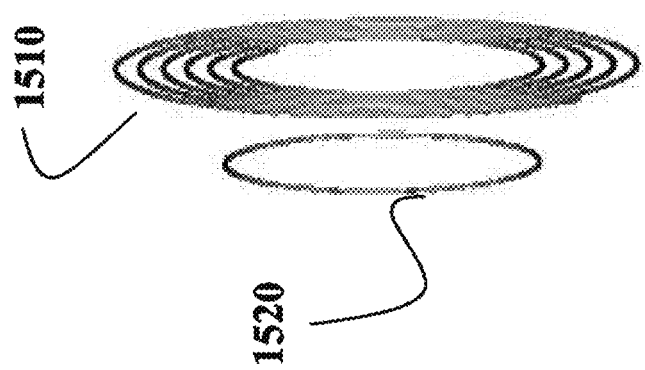
FIG. 15B

WIRELESS ENERGY TRANSFER WITH ANISOTROPIC METAMATERIALS

RELATED APPLICATIONS

This application is a continuation in part of U.S. patent application Ser. No. 12/731,544 entitled "Wireless Energy Transfer with Metamaterials," filed by Bingnan Wang et al. on Mar. 25, 2010, claimed priority from, and incorporated herein by reference.

FIELD OF THE INVENTION

The present invention relates to transferring energy, and more particularly, to transferring energy wirelessly.

BACKGROUND OF THE INVENTION

Wireless Energy Transfer

Inductive coupling is used in a number of wireless energy transfer applications such as charging a cordless electronic toothbrush or hybrid vehicle batteries. In coupled inductors, such as transformers, a source, e.g., primary coil, generates energy as an electromagnetic field, and a sink, e.g., a secondary coil, subtends that field such that the energy passing through the sink is optimized, e.g., is as similar as possible to the energy of the source. To optimize the energy, a distance between the source and the sink should be as small as possible, because over greater distances the induction method is highly ineffective.

Resonant Coupling System

In resonant coupling, two resonant electromagnetic objects, i.e., the source and the sink, interact with each other under resonance conditions. The resonant coupling transfers energy from the source to the sink over a mid-range distance, e.g., a fraction of the resonant frequency wavelength.

FIG. 1 shows a conventional resonant coupling system 100 for transferring energy from a resonant source 110 to a resonant sink 120. The general principle of operation of the system 100 is similar to inductive coupling. A driver 140 inputs the energy into the resonant source to form an oscillating electromagnetic field 115. The excited electromagnetic field attenuates at a rate with respect to the excitation signal frequency at driver or self resonant frequency of source and sink for a resonant system. However, if the resonant sink absorbs more energy than is lost during each cycle, then most of the energy is transferred to the sink. Operating the resonant source and the resonant sink at the same resonant frequency ensures that the resonant sink has low impedance at that frequency, and that the energy is optimally absorbed. Example of the resonant coupling system is disclosed in U.S. Patent Applications 2008/0278264 and 2007/0222542, incorporated herein by reference.

The energy is transferred, over a distance D, between resonant objects, e.g., the resonant source having a size $L_1$ and the resonant sink having a size $L_2$. The driver connects a power provider to the source, and the resonant sink is connected to a power consuming device, e.g., a resistive load 150. Energy is supplied by the driver to the resonant source, transferred wirelessly and non-radiatively from the resonant source to the resonant sink, and consumed by the load. The wireless non-radiative energy transfer is performed using the field 115, e.g., the electromagnetic field or an acoustic field of the resonant system. For simplicity of this specification, the field 115 is an electromagnetic field. During the coupling of the resonant objects, evanescent waves 130 are propagated between the resonant source and the resonant sink.

Coupling Enhancement

According to coupled-mode theory, strength of the coupling is represented by a coupling coefficient k. The coupling enhancement is denoted by an increase of an absolute value of the coupling coefficient k. Based on the coupling mode theory, the resonant frequency of the resonant coupling system is partitioned into multiple frequencies. For example, in two objects resonance compiling systems, two resonant frequencies can be observed, named even and odd mode frequencies, due to the coupling effect. The coupling coefficient of two objects resonant system formed by two exactly same resonant structures is calculated by partitioning of the even and odd modes according to $$\kappa = \pi |f_{even} - f_{odd}| \qquad (1)$$

It is a challenge to enhance the coupling. For example, to optimize the coupling, resonant objects with a high quality factor are selected.

Accordingly, it is desired to optimize wireless energy transfer between the source and the sink.

SUMMARY OF THE INVENTION

Embodiments of the invention are based on the realization that evanescent wave coupling is enhanced by arranging one or more pieces of metamaterial along the path of the evanescent wave coupling between the source and the sink.

One embodiment of the invention discloses a system configured to exchange energy wirelessly. The system includes a structure configured to exchange the energy wirelessly via a coupling of evanescent waves, wherein the structure is electromagnetic (EM) and non-radiative, and wherein the structure generates an EM near-field in response to receiving the energy; and an anisotropic metamaterial arranged within the EM near-field such that the coupling is enhanced.

Another embodiment discloses a method of transferring electromagnetic energy wirelessly via a coupling of evanescent waves, comprising steps of: increasing amplitudes of the evanescent waves using a metamaterial, such that the coupling is enhanced; providing a first resonator structure having a first mode with a resonant frequency $\omega_1$, an intrinsic loss rate $\Gamma_1$ and a first Q-factor $Q_1 = \omega_1/(2\Gamma_1)$, wherein the first resonator structure is electromagnetic and designed to have $Q_1 > 100$; providing a second structure positioned distal from the first electromagnetic resonator structure and not electrically wired to the first resonator structure, the second resonator structure has a second mode with a resonant frequency $\omega_2$, an intrinsic loss rate $\Gamma_2$, a second Q-factor $Q_2 = \omega_2/(2\Gamma_2)$, wherein the second resonator structure is electromagnetic and designed to have $Q_2 > 100$; arranging the anisotropic metamaterial between the first resonator structure and the second resonator structure; and transferring the electromagnetic energy from the first resonator structure through the anisotropic metamaterial to the second resonator structure over a distance D, wherein the distance D is smaller than each of the resonant wavelength $\lambda_1$ and $\lambda_2$ corresponding to the resonant frequencies $\omega_1$ and $\omega_2$ respectively.

Yet another embodiment discloses a system configured to exchange electromagnetic energy wirelessly, comprising: a first resonator structure having a first mode with a resonant frequency $\omega_1$, an intrinsic loss rate $\Gamma_1$ and a first Q-factor $Q_1 = \omega_1/(2\Gamma_1)$, wherein the first resonator structure is electromagnetic and designed to have $Q_1 > 100$; a second structure positioned distal from the first electromagnetic resonator structure and not electrically wired to the first resonator structure, the second resonator structure has a second mode with a resonant frequency $\omega_2$, an intrinsic loss rate $\Gamma_2$, a second Q-factor $Q_2=\omega_2/(2\Gamma_2)$, wherein the second resonator structure is electromagnetic and designed to have $Q_2>100$; and a metamaterial arranged between the first resonator structure and the second resonator structure, wherein the first resonator structure transfer the electromagnetic energy through the anisotropic metamaterial to the second resonator structure over a distance D, wherein the distance D is smaller than each of the resonant wavelength $\lambda_1$ and $\lambda_2$ corresponding to the resonant frequencies $\omega_1$ and $\omega_2$ respectively.

BRIEF DESCRIPTION OF THE DRAWINGS

FIG. 10 is a table comparing an efficiency of energy transfer as a function of frequency with and without the NIM;

FIG. 14 is an example of an anisotropic metamaterial; and

FIGS. 15A-C are example of wireless power transfer system with anisotropic metamaterials.

DETAILED DESCRIPTION OF THE PREFERRED EMBODIMENTS

Embodiments of the invention are based on a realization that a metamaterial, e.g., a negative index material (NIM) and/or single-negative (SNG) metamaterial, isotropic and anisotropic metamaterials, arranged in an electromagnetic (EM) near-field on a path of an evanescent wave while energy is transferred wirelessly, increases amplitude of the evanescent wave and, thus, optimizes the efficiency of the energy transfer.

Figure 1:
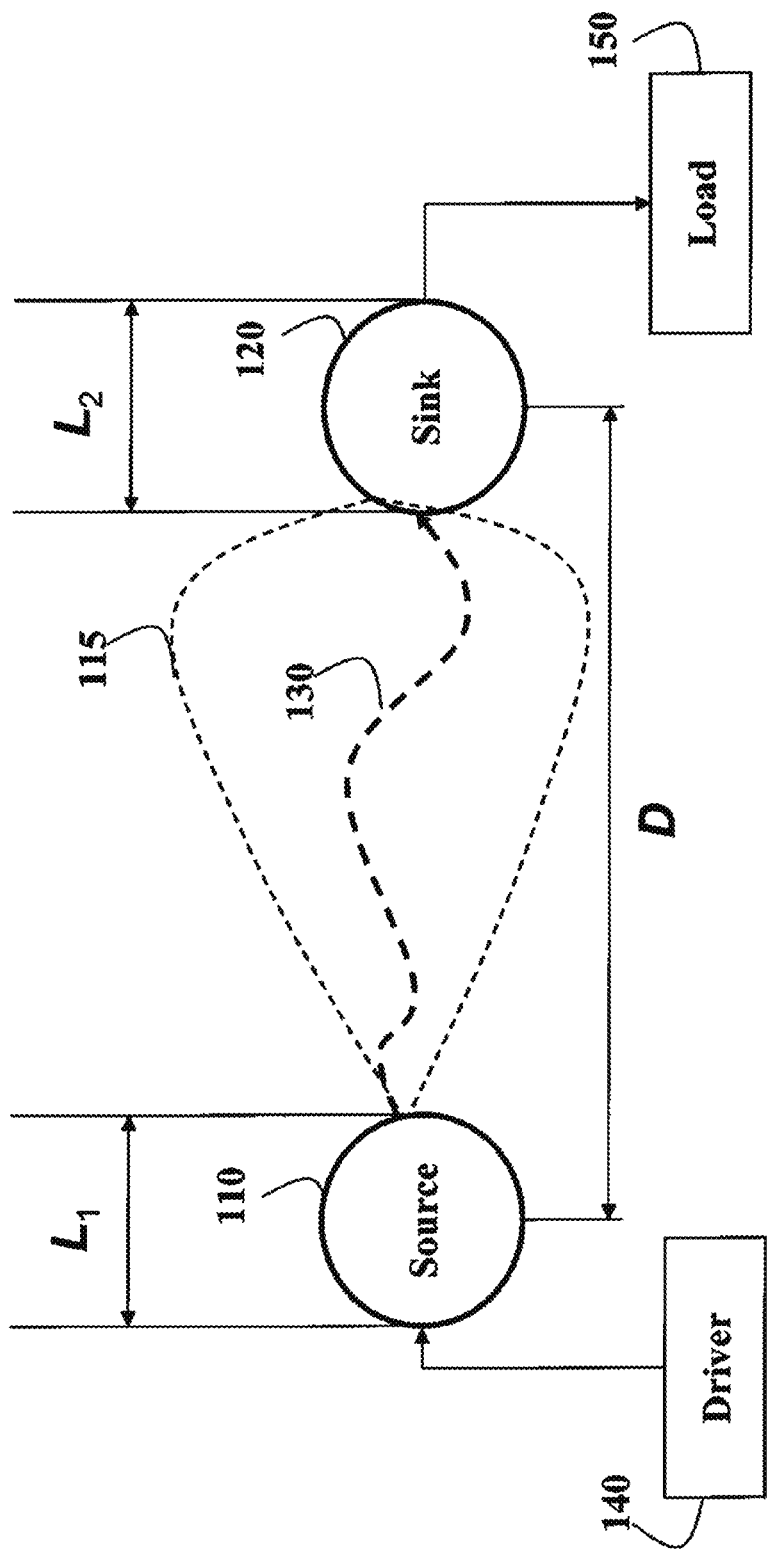
FIG. 1 is a block diagram of a conventional resonant coupling system.
Figure 2:
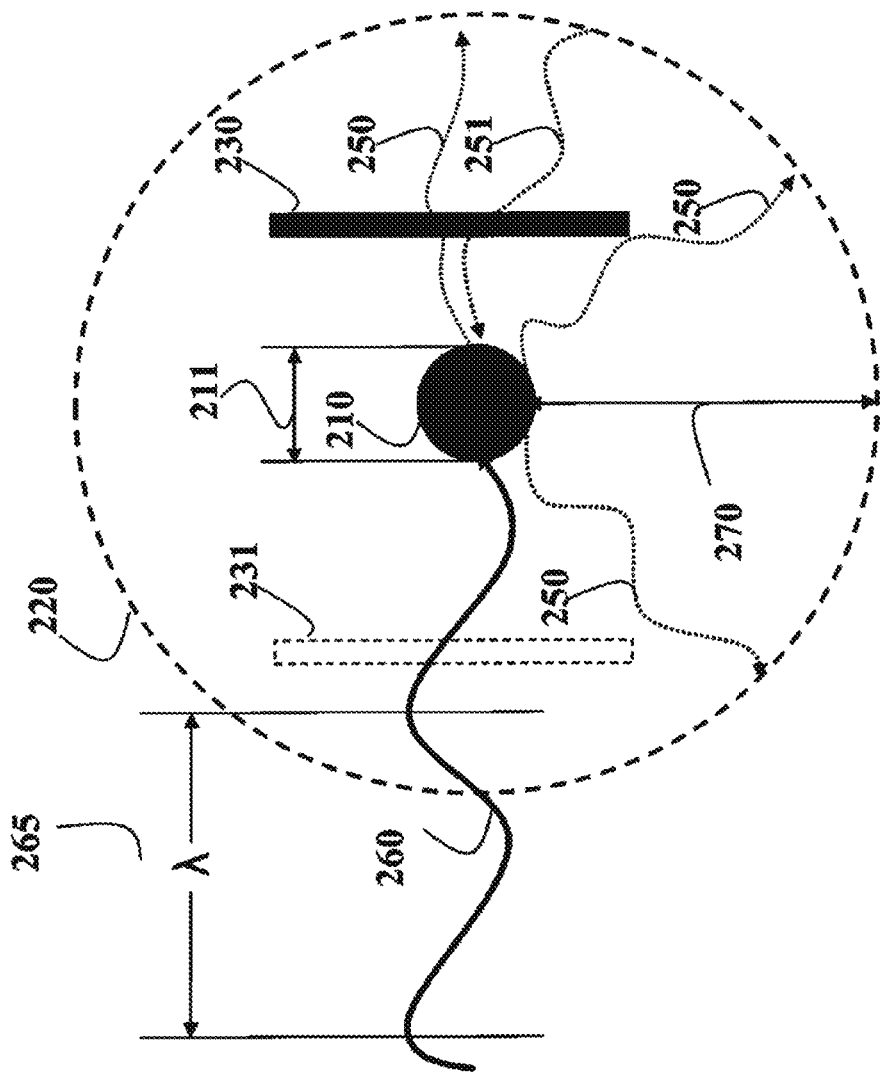
FIG. 2 is an example of a system suitable to transfer or receive energy wirelessly.

FIG. 2 shows a system 200 according an embodiment of the invention. The system is configured to exchange, e.g., transmit or receive, energy wirelessly and includes an electromagnetic (EM) non-radiative structure 210 having dimensions 211, e.g., a diameter, configured to generate an electromagnetic near-field 220 when the energy is received by the structure and exchange the energy wirelessly via a coupling of evanescent waves.

Most of the energy is reactive and confined in the transmitter or resonator and only a small portion of the energy can radiate to the far field (usually less than 10 percent).

In one embodiment, the energy 260 is supplied by a driver (not shown) as known in the art. In this embodiment, the structure 210 serves as a source of the wireless energy transfer system. In alternative embodiment, the energy 260 is supplied wirelessly from the source (not shown). In that embodiment, the structure 210 serves as a sink of the wireless energy transfer system.

The system 200 further includes the metamaterial 230 arranged within the near-field 220. The metamaterial is a material with negative permittivity and/or negative permeability properties. Several unusual phenomena are known for this material, e.g., evanescent wave amplification, surface plasmoni-like behavior and negative refraction. Embodiments of the invention appreciated and utilized the unusual ability of the metamaterial to amplify evanescent waves, which optimizes wireless energy transfer.

When the energy 260 is received by the structure 210, the EM near-field is generated in substantially all directions around the EM structure. The near-field is contrasted with far-field. Because the structure is non-radiative, most of the energy is confined within the near-field and only a small portion, e.g., less than 10%, of the energy radiates to the far field.

Within the near-field, the shape and dimensions of the near-field depends on a frequency of the external energy 260, and on a resonant frequency of the EM structure 210, determined in part by a shape of the EM structure, e.g., circular, helical, cylindrical shape, and parameters of a material of the EM structure such as conductivity, relative permittivity, and relative permeability. In one embodiment, to minimize loss of the energy due to radiation, the size of the structure is much smaller than a length of a dominant wavelength of the system, e.g., 100 times smaller than the length.

Usually, a range 270 of the near-field is a fraction of the length of the dominant wavelength of the system, e.g., $\frac{1}{4}^{th}$, or $\frac{1}{10}^{th}$ of the length. In non resonant systems, the dominant wavelength is determined by a frequency of the external energy 260, i.e., the wavelength $\lambda$ 265. In resonant systems, the dominant wavelength is determined by a resonant frequency of the EM structure. In general, the dominant wavelength is determined by the frequency of the wirelessly exchanged energy.

The resonance is characterized by a quality factor (Q-factor), i.e., a dimensionless ratio of stored energy to dissipated energy. Because the objective of the system 200 is to transfer or to receive the energy wirelessly, the frequency of the driver or the resonant frequency is selected such as to increase the dimensions of the near-field region. In some embodiments, the frequency of the energy 260 and/or the resonant frequency are in diapason from MHz to GHz. In other embodiments, aforementioned frequencies are in the light domain.

Evanescent Wave

An evanescent wave is a near-field standing wave with an intensity that exhibits exponential decay with distance from a boundary at which the wave is formed. The evanescent waves 250 are formed at the boundary between the structure 210 and other "media" with different properties in respect of wave motion, e.g., air. The evanescent waves are formed when the external energy is received by the EM structure and are most intense within one-third of a wavelength of the near field from the surface of the EM structure 210.

It is to be understood, that number of different configurations of the system 200 are possible in addition to the embodiments described below. For example, in one embodiment, the system 200 is a sink configured to receive the energy wirelessly from the source. In another embodiment, the system 200 is the source configured to transmit energy wirelessly to the sink. In yet another embodiment, the system 200 is the source configured to transfer energy concurrently to multiple sinks.

In some embodiments, during the operation of the system 200, the structure 210 regardless of being either the source or the sink, receives evanescent waves 251 concurrently with emitting the evanescent waves. The metamaterial 230 is arranged on a path of at least one evanescent wave 250 or 251. If a desired direction of the energy to be transferred or the energy to be received is known, then the metamaterial is arranged optimally, e.g., metamaterial 230 or NIM 231, based on the desired direction of the energy exchange.

In other embodiments, multiple metamaterials are optimally arranged on the path of the evanescent waves to maximize the amplitude of the waves.

Figure 3A:
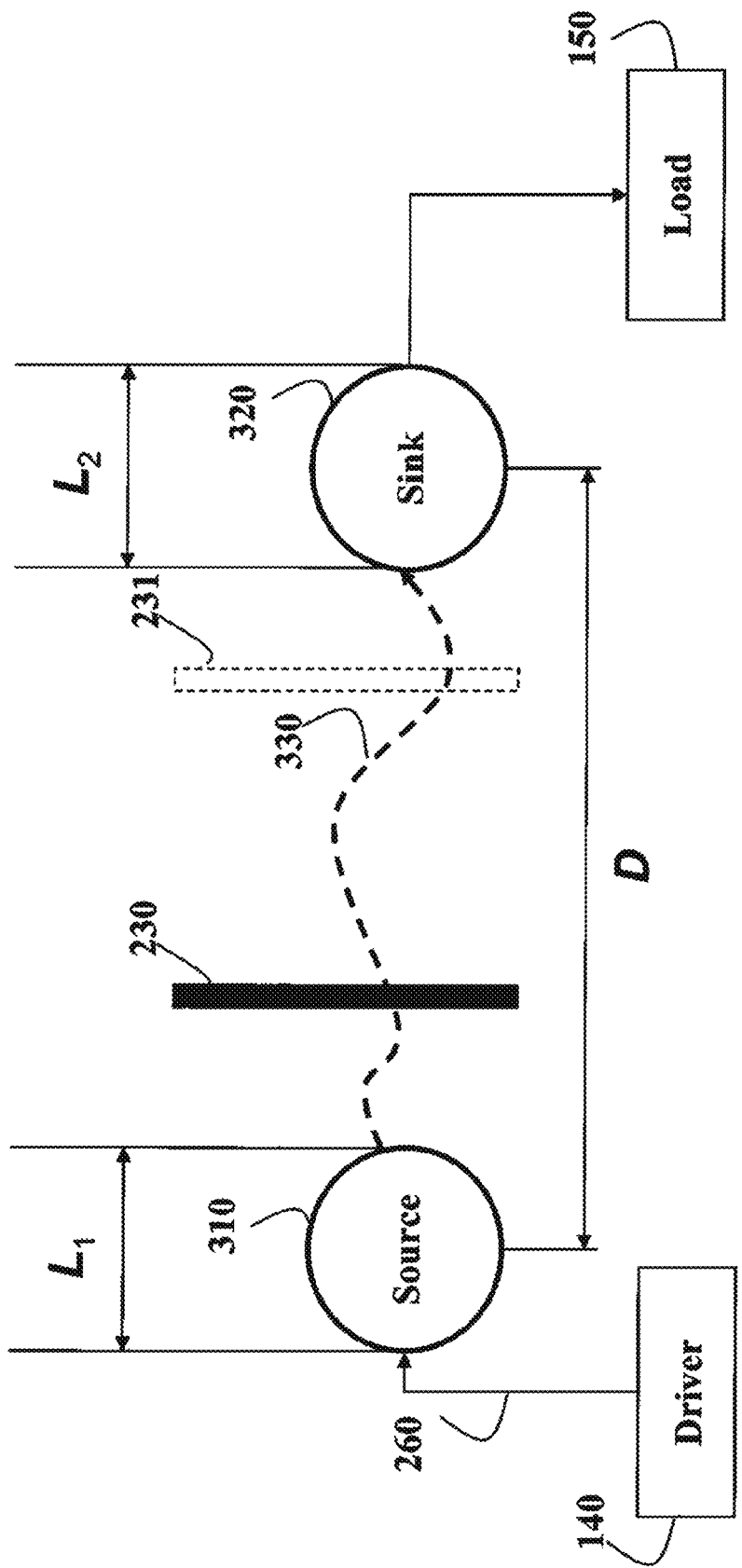
FIGS. 3-6 are block diagrams of different embodiments of the invention.

FIG. 3A shows a system 300 according to another embodiment of the invention. The system 300 is a resonant coupling system and includes at least one metamaterial 230 arranged within the near-field of the source 310 on the path of the evanescent wave 330. The energy 260 is provided to the system 300 by the driver 140, transmitted wirelessly by the source 310 via the evanescent wave 330 to the sink 320 and consumed by the load 150. In one embodiment, the load includes a processer.

In one variation of the system 300, the metamaterial 230 is arranged nearer to the source than to the sink 320. In another variation, the metamaterial 231 is arranged nearer to the sink than to the source. In yet another variation, plurality of metamaterials 230-231 are arranged on the path of the evanescent wave 330, such that the evanescent wave travels through each metamaterial in the plurality of metamaterials during the coupling. In general, the metamaterial is arranged such that to optimize evanescent waves coupling between the source and the sink during the wireless energy transfer. In one embodiment, the metamaterial is arranged such that the distance between the metamaterial and the structure is proportional to the dimensions of the metamaterial.

One variation of the system 300 includes a first electromagnetic resonator structure 310 having a first mode with a resonant frequency $\omega_1$, an intrinsic loss rate $\Gamma_1$ and a first Q-factor $Q_1=\omega_1/(2\Gamma_1)$, and a second electromagnetic structure 320 positioned distal from the first electromagnetic resonator structure and not electrically wired to the first resonator structure. The second resonator structure has a second mode with a resonant frequency $\omega_2$, an intrinsic loss rate $\Gamma_2$ and a second Q-factor $Q_2=\omega_2/(2\Gamma_2)$.

The first resonator structure transfers electromagnetic energy to the second resonator structure over a distance D that is smaller than each of the resonant wavelength $\lambda_1$ and $\lambda_2$ corresponding to the resonant frequencies $\omega_1$ and $\omega_2$ respectively. Furthermore, the electromagnetic resonant structures are designed to have values of the first and the second Q-factors greater than 100, i.e., $Q_1>100$ and $Q_2>100$.

One of the main features of this embodiment is the arrangement of the metamaterial 230 between the first resonator structure and the second resonator structure, such that the first resonator structure transfer the electromagnetic energy through the metamaterial to the second resonator structure over the distance D, wherein the distance D is smaller than each of the resonant wavelength $\lambda_1$ and $\lambda_2$ corresponding to the resonant frequencies $\omega_1$ and $\omega_2$ respectively.

In different variation of this embodiment, the values of the Q-factors are greater than 200, 500, or 1000. Additionally or alternatively, the two frequencies $\omega_1$ and $\omega_2$ are close to within the narrower of $\Gamma_1$ and $\Gamma_2$. Additionally or alternatively, different number, type and or arrangement of the metamaterial are used.

Evanescent Wave Coupling

Evanescent wave coupling is a process by which electromagnetic waves are transmitted from one medium to another by means of the evanescent, exponentially decaying electromagnetic field.

Coupling is usually accomplished by placing two or more electromagnetic elements, i.e., the source and the sink, at some distance D to each other such that the evanescent waves generated by the source does not decay much before reaching the sink. If the sink supports modes of the appropriate frequency, the evanescent field gives rise to propagating wave modes, thereby connecting (or coupling) the wave from one waveguide to the next.

Evanescent wave coupling is fundamentally identical to near field coupling in electromagnetic field theory. Depending on the impedance of the radiating source element, the evanescent wave is either predominantly electric (capacitive) or magnetic (inductive), unlike in the far field where these components of the wave eventually reach the ratio of the impedance of free space and the wave propagates radiatively. The evanescent wave coupling takes place in the non-radiative field near each medium and as such is always associated with matter, i.e. with the induced currents and charges within a partially reflecting surface.

Figure 3C:
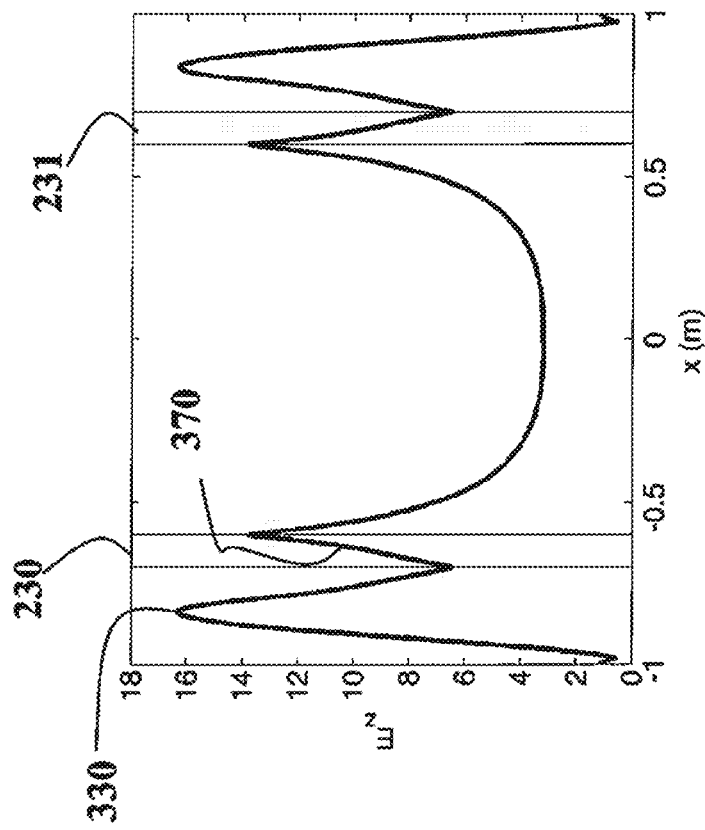
Figure 3B:
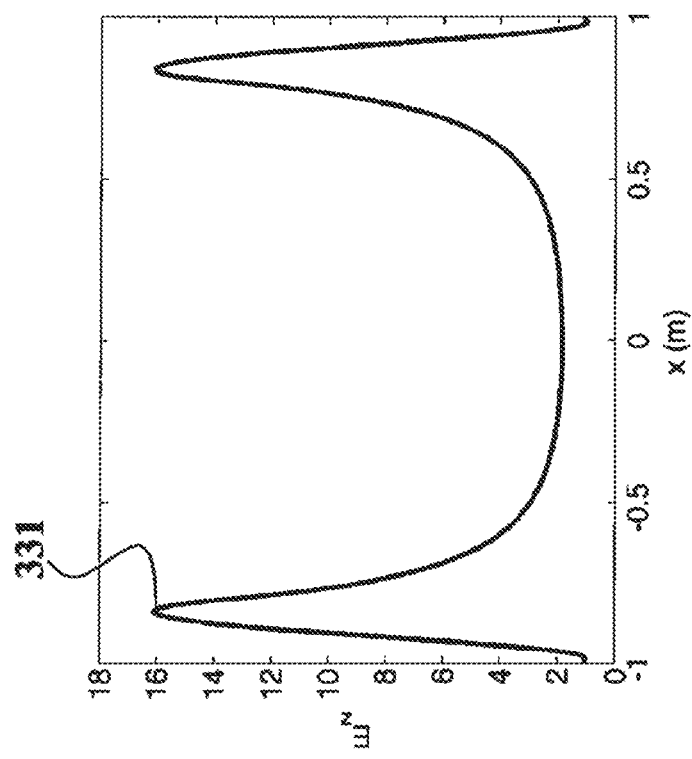

FIGS. 3B-3C show evanescent waves coupling with or without the NIM respectively. When the energy is supplied to the source, the near field is created. Radiation loss and dielectric loss consume part of the energy, but if the radiation is not strong, most of the energy is reflected back to the source. However, when the sink is arranged sufficiently close to the source, i.e., at the distance D apart from the source, the evanescent waves 331 and/or 330 are coupled between the source and the sink, such that the energy is transferred from the source to the sink. As shown in FIG. 3B, without the NIM, the energy is transferred through the coupling of the evanescent waves of the source and the sink.

However, when the metamaterial is arranged in the near field created by the source and/or the sink during the coupling of the source and the sink, amplitude of the evanescent wave is increased 370 when the wave is traveling through the metamaterial, as shown in FIG. 3C. Thus, the evanescent wave coupling is enhanced and the energy is transferred more efficiently and/or the distance D between the source and the sink is increased.

Figure 4:
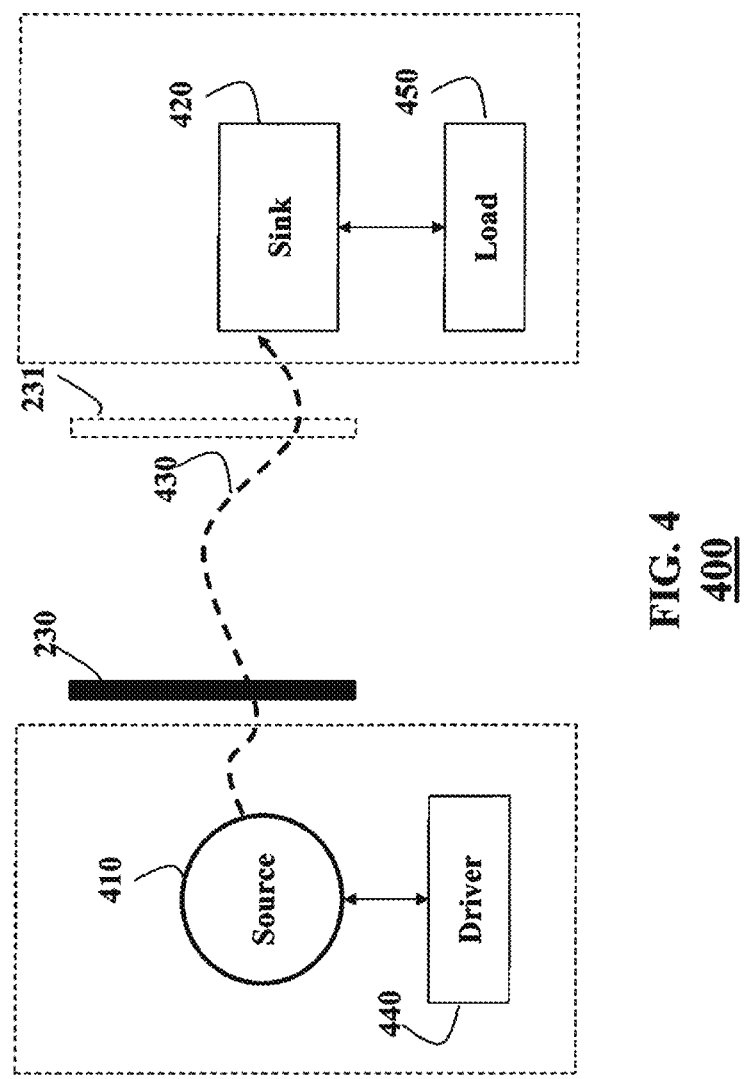

FIG. 4 shows a system 400 according to another embodiment of the invention. The system 400 is a non-resonant system. The non-resonant system, in contrast with the resonant system, is designed such that the source 410 and the sink 420 have different resonant frequencies. For example, in one variation of the system 400, both the source and the sink are resonant structures having different resonant frequencies. In another variation, the sink 420 is a non-resonant structure, e.g., the load 450. In another variation, the source 410 is a non-resonant structure, e.g., the driver 440.

Figure 5:
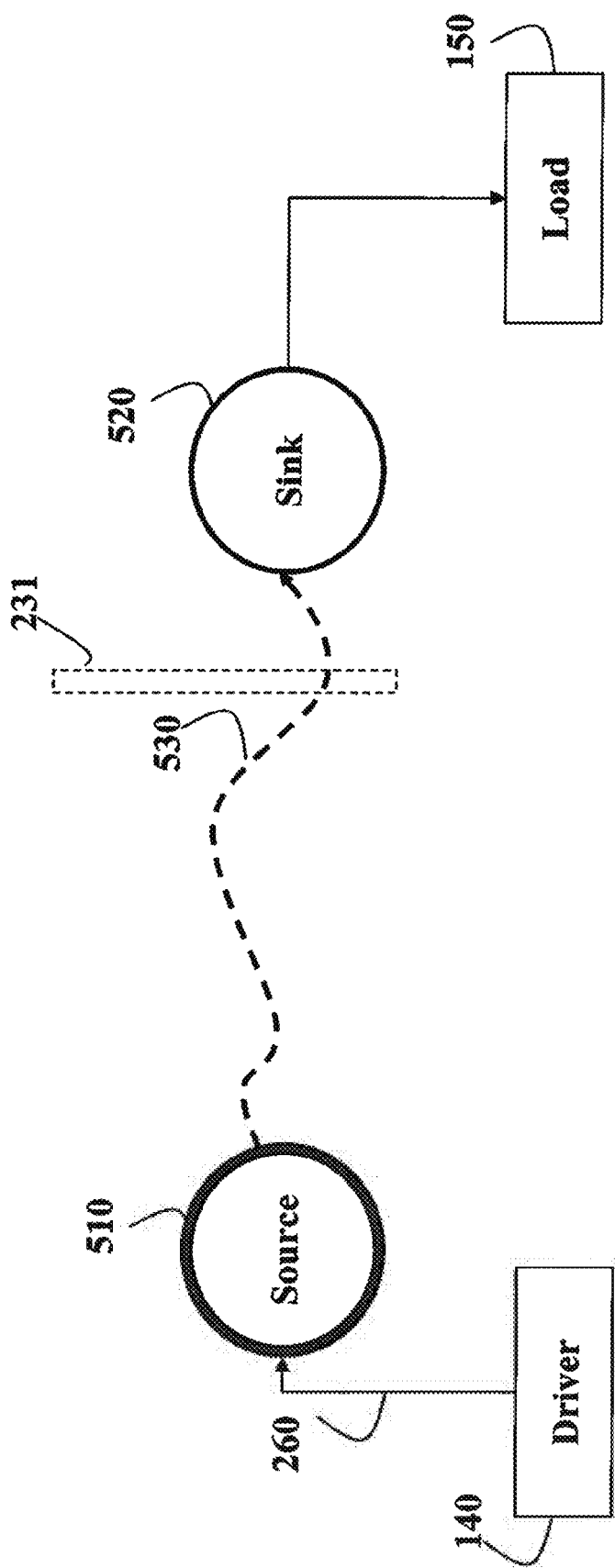

FIG. 5 shows a system 500 according to yet another embodiment of the invention. In this embodiment, the material of the EM structure itself includes the metamaterial. For example, in one variation of this embodiment, the source 510 is made of the metamaterial. In other variations, the sink 520 and/or both the sink and the source are made of the metamaterial. In different variations, the source and the sink are made of the same or different metamaterials. In yet another variation of embodiment, a second metamaterial 231 is positioned on the path of the evanescent wave 530 in addition to the metamaterial included in the EM structures.

Figure 6:
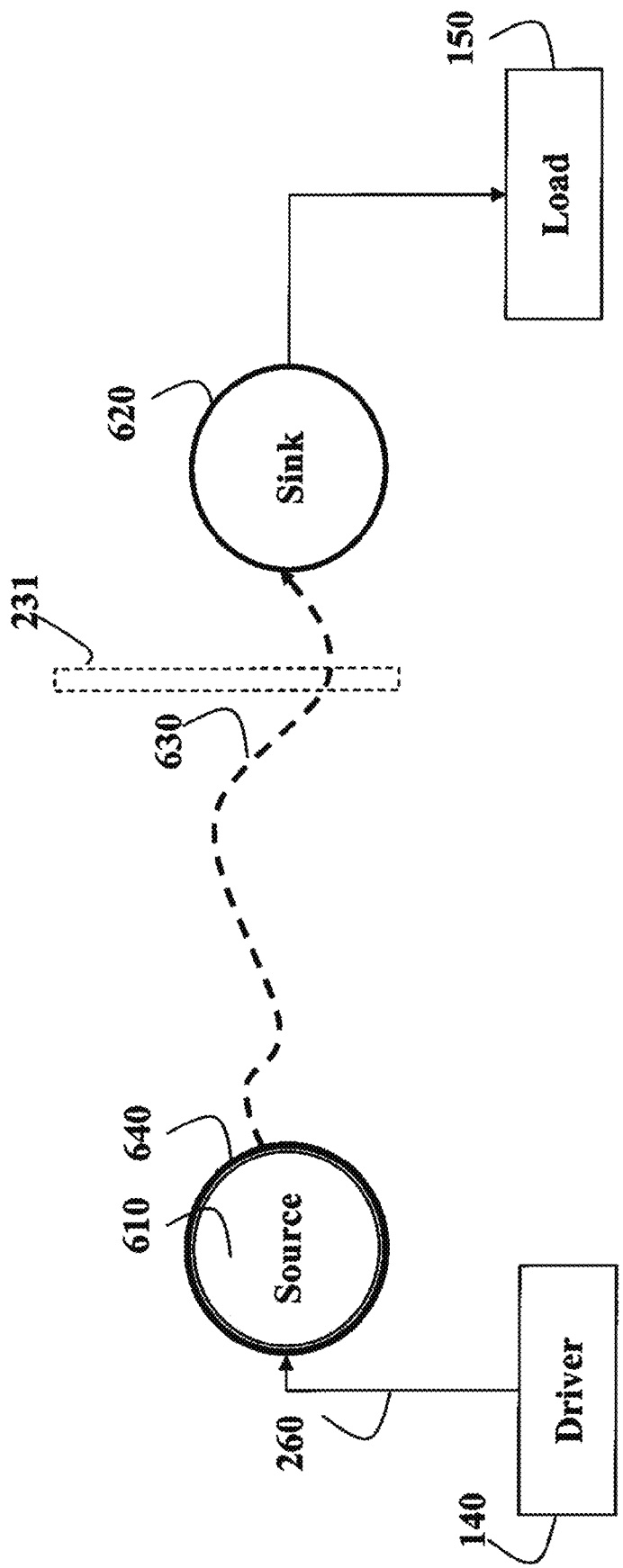

FIG. 6 shows a system 600 according to yet another embodiment of the invention. In this embodiment, the metamaterial 640 substantially encloses the EM structure 610. For example, in one variation of this embodiment, the source 610 has a cylindrical shape, and the metamaterial has similar cylindrical shape with slightly greater diameter. In other variations, the sink 620 and/or both the sink and the source are enclosed by the metamaterial. In another variation of embodiment, a second metamaterial 231 is positioned on the path of the evanescent wave 630 in addition to the metamaterial 640. This embodiment is particularly advantageous in applications with multiple directions of the energy exchange, or wherein the direction is not known in advance.

Table of FIG. 10 shows coupling coefficients calculated for different wireless energy transfer system. The coupling coefficient is a measure of the strength of coupling between two EM structures, and quantifies a rate at which energy transfer occurs between those EM structures. Based on the FIG. 6, it is clear that the embodiments of the invention increase the coupling coefficient and thus increase the efficiency of the systems. For example, a single block of the metamaterial increases the coupling coefficient in one system from 3.88e4 to 7.6e4. Two blocks of the metamaterial further increase the coupling coefficient to 14.8e4.

Embodiments of the invention can be used in variety of applications, systems and devices, which require wireless energy transfer, e.g., in a car, a mobile communicator, a laptop, an audio/video device.

Figure 7:
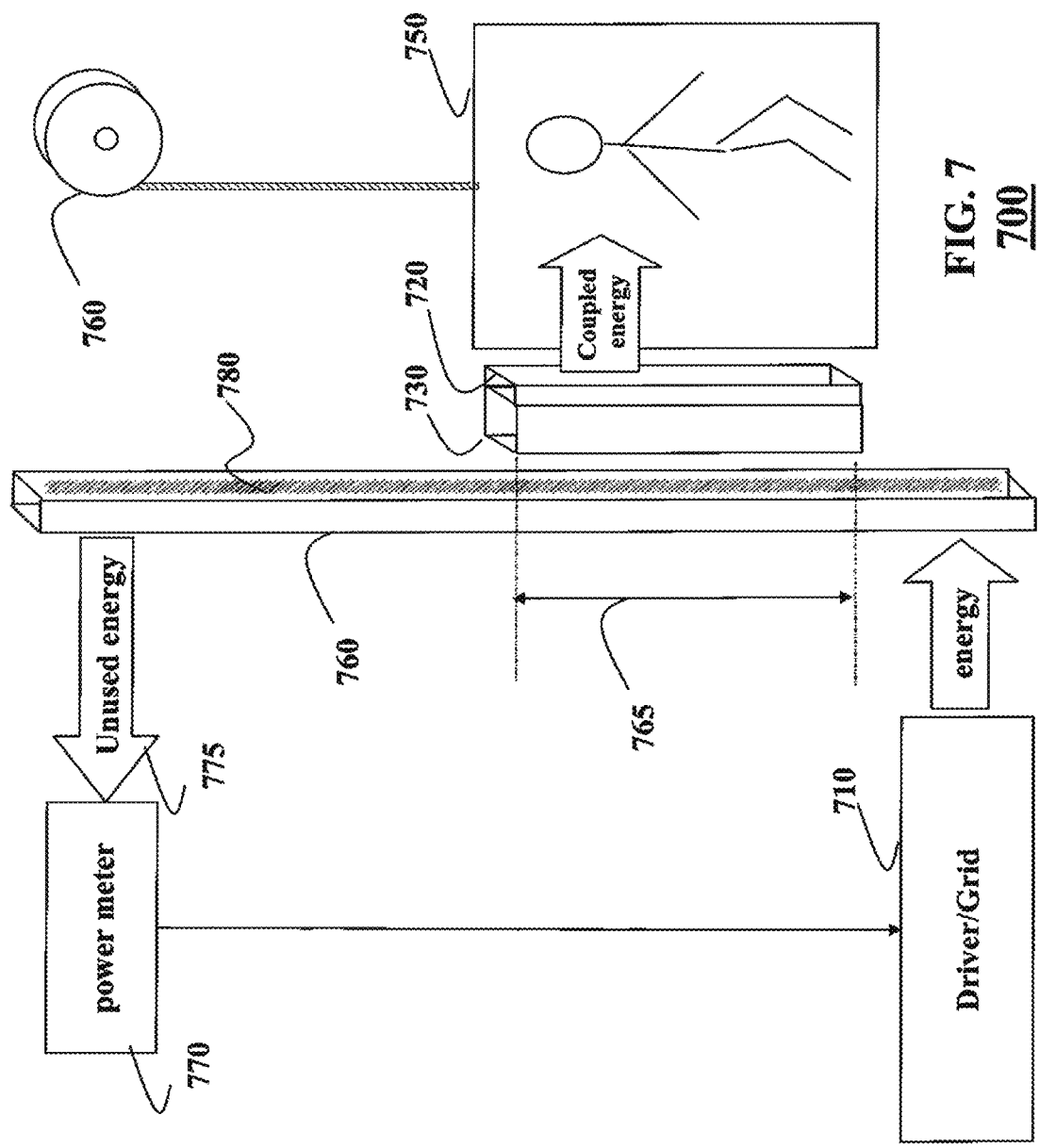
FIG. 7 is an example of a system for supplying energy wirelessly to moving devises.

FIG. 7 shows a system 700 for supplying energy wirelessly to moving devices, such as elevator cars and electric vehicles. In one embodiment, a cable-less elevator car 750, i.e., the load, is connected to an antenna 720, i.e., the sink, configured to receive the energy wirelessly from a waveguide 760. The waveguide is installed at a hoistway and receives energy from a driver 720. The driver can be connected to a power grid and supply energy to the waveguide, e.g., inductively. The waveguide is configured to generate electromagnetic evanescent waves. For example, in one embodiment, the waveguide is implemented via a conductive wire. In another embodiment, one side of the waveguide includes has perforations or slots 780 to allow evanescent waves to exist on a surface of the waveguide.

The metamaterial 730 is arranged between the sink and the waveguide, e.g., affixed to the antenna 720, such that when the antenna is moved, the metamaterial is moved dependently. The metamaterial is positioned such that the evanescent waves emitted from an energy transfer area 765 of the waveguide reaches the antenna through the metamaterial. When the cage is moved by a pulling mechanism 760, the energy transfer area is adjusted accordingly.

The antenna 720 and the metamaterial 730 form the system 200. When connected to devices having at least one degree of freedom, such as an elevator cage, an electric car, and a cell phone, the system 200 allows the devices to receive energy wirelessly yet efficiently.

Negative Index Material (NIM)

Some embodiments of the invention use NIM as the metamaterial. NIM is an artificial material with negative permittivity $\in$ and negative permeability $\mu$ properties. The evanescent wave between the source and the sink is amplified while propagating through the NIM, which optimized energy transfer.

In some embodiments, the NIM used in the system has electromagnetic properties as $\in=-1, \mu=-1$. When the evanescent wave propagates through the NIM, impedance of the NIM is matched with free space impedance, no reflection occurs at the interface of NIM and free space, which is critical for power transmission, and the evanescent wave is amplified through NIM.

In other embodiments, the NIM has negative values of permittivity $\in$ and permeability $\mu$ properties, but not necessarily exactly $-1$. In those embodiments, surface plasmons are excited on an interface between the NIM and other media such as air, gas or vacuum while accumulating energy and EM field intensity. The NIM usually comes with material loss, partly from the dielectric loss, and partly from dispersive loss.

The material loss decreases the evanescent wave amplification during propagation through the NIM. However, the surface wave is excited and energy is accumulated at the interface between the NIM and other media. This property extends the evanescent wave propagation and optimizes the energy coupling between the source and the sink.

There are number of different methods to design the NIM. For example, split ring resonator (SRR) with metal wire structure is one example of an artificial material design of the NIM. SRR and an inductive-capacitive (LC) resonator is another example of the NIM design. Embodiments of the invention use any type of NIM that meets the objective of evanescent wave enhancement. In one embodiment, the system is a resonant one, and the NIM has a refractive index equals to $-1$ at the resonant frequency of the system.

Figure 8:
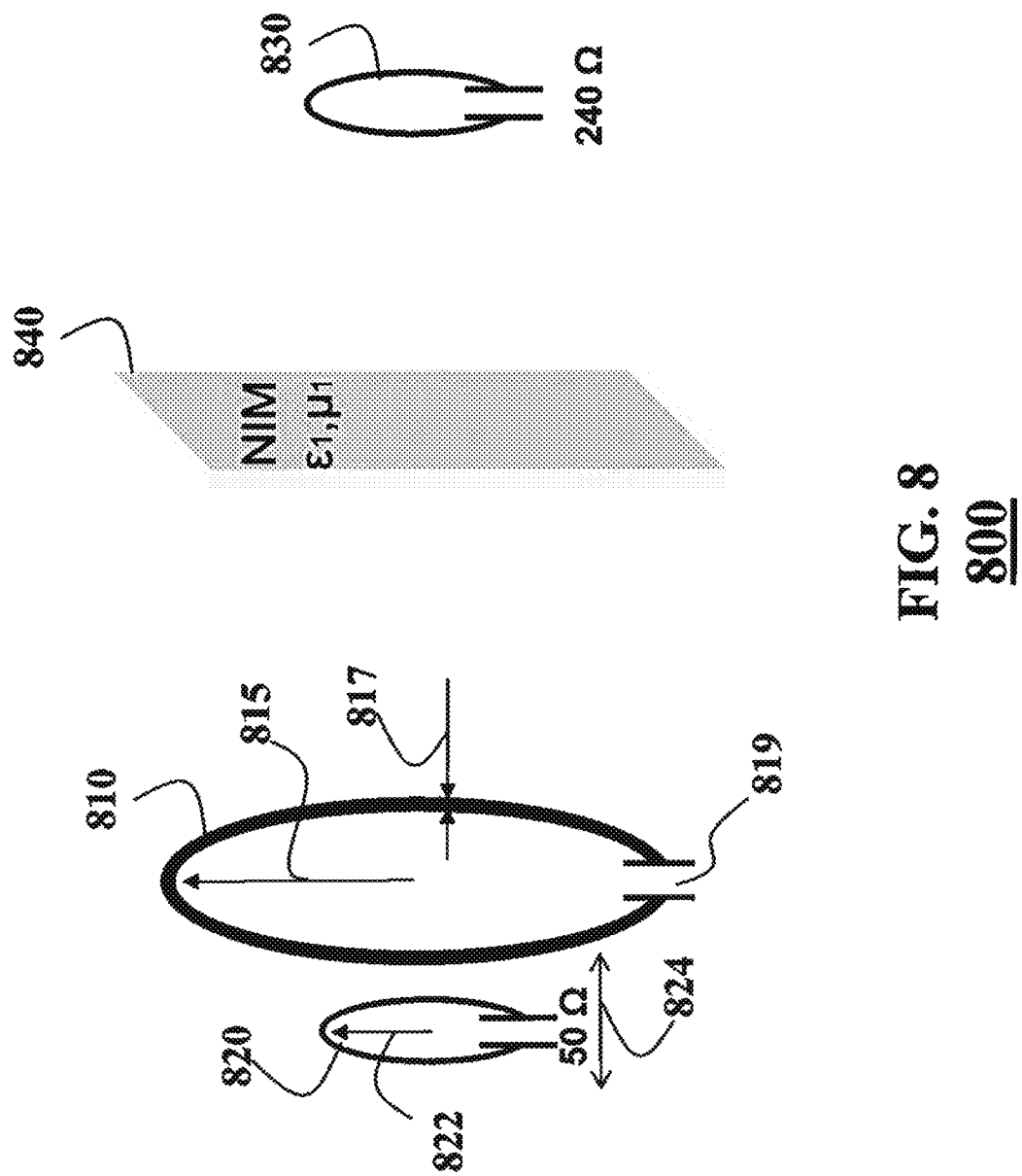
FIG. 8 shows an example of application of NIM in a capacitance loaded loop resonant system 800 resonating at about 8 MHz.

FIG. 8 shows an example of application of NIM in a capacitance loaded loop resonant system 800 resonating at about 8 MHz. A capacitance loaded loop 810 serves as the source of the system 800. The capacitance loaded loop has a radius 815 of 30 cm, and copper wire cross section radius 817 of 2 cm and capacitance dielectric disk area 819 of 138 cm$^2$, with the permittivity property $\in=10$. The energy is confined in the near range of LC loop in the format of evanescent wave.

A metal loop structure 820 with a load of 50 Ohm is the driver of the system. Similarly, a metal loop 830 with a load of 240 Ohm is the load of the system. The NIM 840 is arranged between the source and the load in the near-field of the source. Radius 822 of the driver and the load are 20 cm. The driver is arranged at a distance of 20 cm from the source 824, and the driver is inductively coupled with the source.

The arrangement of the NIM in the near-field depends on a design of the driver and the load, especially where the impedance at the driver and load needs to be modified to achieve maximum power transfer efficiency.

In order to get the maximum coupling enhancement, a physical cross sectional size, thickness, and the position of NIM with respect to the energy transfer field needs to be optimized, according to configuration of the elements of the system, e.g., the source, the sink, the driver, and the load and the environment the system is located in. In one embodiment optimization is accomplished through computer modeling or experimentally to enable best impedance matching to allow maximum power transfer.

Figure 9:
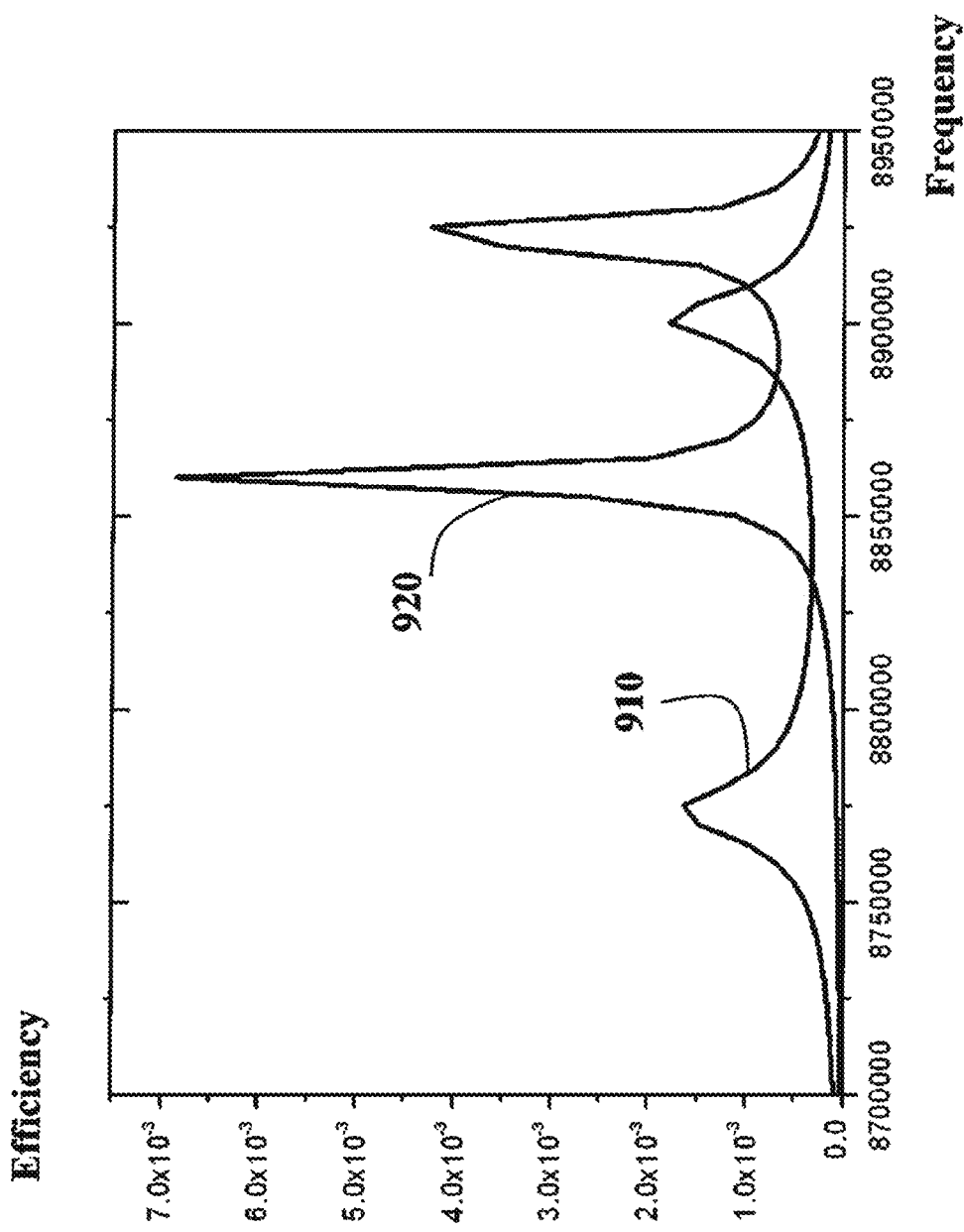
FIG. 9 is a graph comparing an efficiency of energy transfer as a function of frequency with and without the NIM.

FIG. 9 is a graph comparing of an efficiency of energy transfer as a function of frequency with and without the NIM. As shown, the efficiency of the systems, which includes the NIM 920, is more than three times greater the efficiency 910 of the corresponding systems without the NIM.

NIM material with exact electromagnetic properties occurs only at single frequency, which means the exact material properties $\in=-1, \mu=-1$ only occurs at one frequency, such as f=8 MHz. However, the NIM displays the negative electromagnetic properties in bandwidth of about 5-10% of the resonant frequency. In systems wherein the NIM is designed to work at 10 MHz, about 0.5 MHz to 1 MHz bandwidth is achieved around 10 MHz for the permittivity and the permeability to be negative. In this bandwidth, NIM is utilized in wireless power transfer system to enhance coupling and power transfer efficiency, if the negative EM properties frequency range of the NIM covers the resonant component resonance frequency point.

Single-Negative (SNG) Metamaterials

Some embodiments of the invention use single-negative (SNG) metamaterial as the metamaterial. SNG metamaterials are the metamaterials with either only the negative permittivity, i.e., $\in<0, \mu>0$, or only negative permeability, i.e., $\in>0, \mu<0$. More specifically, metamaterials with $\in<0, \mu>0$ are ∈-negative (ENG) metamaterials and ∈>0, μ<0 metamaterials are μ-negative (MNG) metamaterials.

In one variation of the embodiments, the dimensions 211 of the system 200 are smaller than the wavelength 265, such that EM far-field radiations of the structure are neglected and electric field and magnetic field are independent of each other. The independence of the electric field and the magnetic field allows using an electric-dominant or a magnetic-dominant of the near field separately. For the near field having the electric-dominant, the metamaterial with only the negative permittivity ∈ is used to enhance the evanescent waves. For the near field having the magnetic-dominant, the metamaterial with only negative permeability μ is used to enhance the evanescent waves.

Accordingly, in some embodiments, a type of the SNG material configured to enhance the evanescent coupling is selected based on a type of the coupling. For example, in one embodiment, the coupling is an electric-dominant coupling, and the SNG metamaterial is the ENG metamaterial. In another embodiment, the coupling is a magnetic-dominant coupling, and the SNG metamaterial is the MNG metamaterial.

Metamaterials are dispersive and have material losses, which affect the enhancement of the evanescent waves during wireless energy transfer. NIMs usually include two sets of resonant structures, one to give negative electric permittivity (∈<0) and the other to give negative magnetic permeability (μ<0). The two sets of structures contribute to the losses and dispersion of the metamaterials. Also, the design of NIMs is relatively complicated because the structures need to be designed such that the ∈<0 region and the μ<0 region coincide with each other to give negative refractive index.

For SNG metamaterials, only one set of artificial structures are required to achieve either ∈<0 or μ<0 properties. There are important advantages of SNG metamaterials over NIMs. First, design of SNG metamaterials is simpler. Second, fabrication process of SNG metamaterials is simpler. Third, the losses associated with SNG metamaterials are, typically, smaller than the losses associated with NIM. Usually, the performance of wireless energy transfer systems with SNG metamaterials is better than the performance of systems with NIMs.

Figure 11:
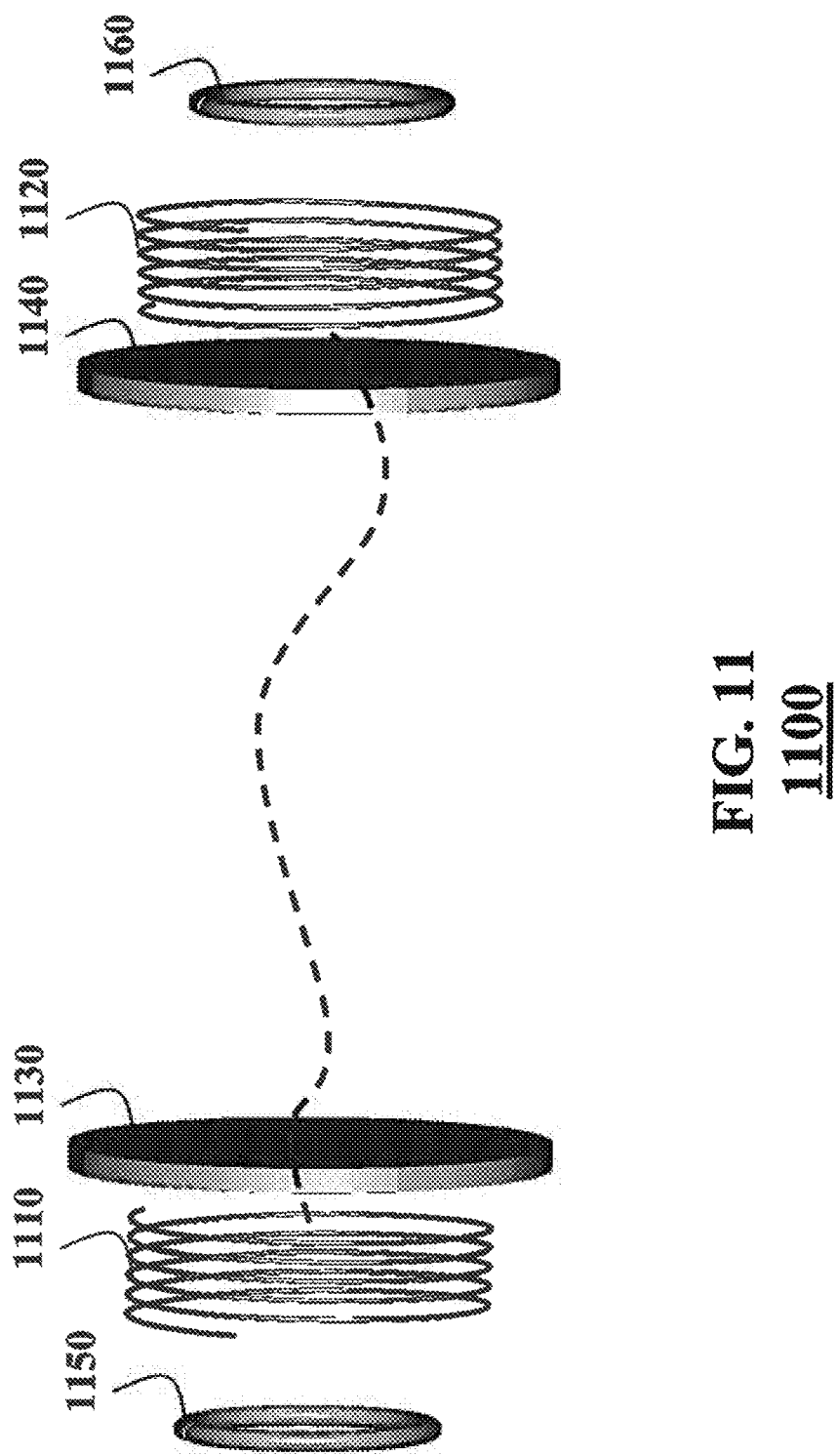
FIG. 11 is an example of a system suitable to transfer or receive energy wirelessly.

FIG. 11 shows an example of a wireless energy transfer system 1100 according one embodiment of the invention. The source 1110 and the sink 1120 are identical self-resonant coils made of copper wires. The radius of the coils is 30 cm, and the radius of the copper wires is 5 mm. Each coil is composed 5.25 turns of such copper wires and extends for 20 cm. The resonant frequency of the coils is approximately 10 MHz. The distance between the two coils is 2 m.

Two metallic loops with radius equals to 20 cm are the driver 1150 and the load 1160. The positions of the two small metallic loops are adjusted to optimize impedance matching and wireless energy transfer efficiency. Two metamaterial slabs 1130 and 1140 are used in the system to improve the performance. The metamaterials are in cylindrical shape, with radius 40 cm and height 4 cm. The optimized transfer efficiencies of different systems are calculated by software and compared.

Figure 12:
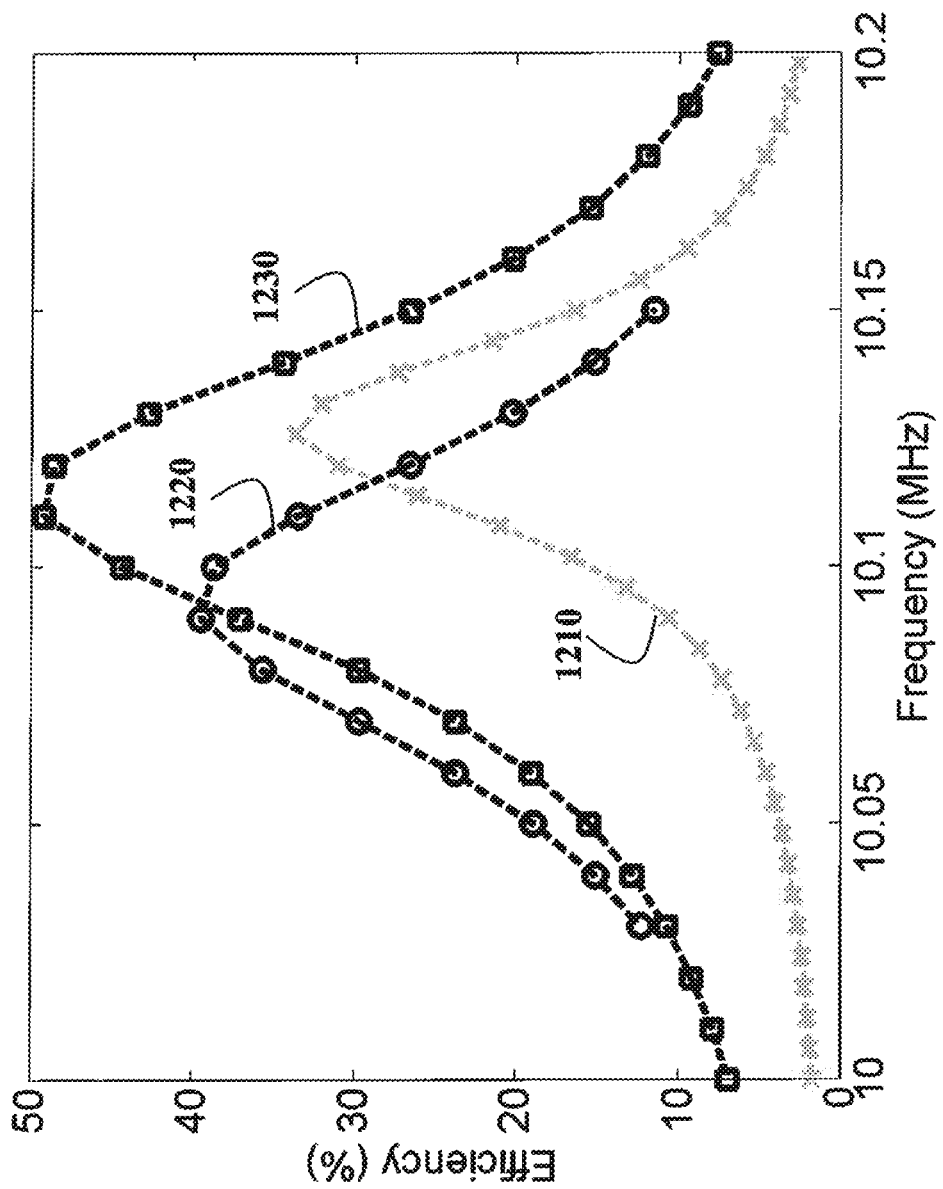
FIG. 12 is a graph comparing an efficiency of energy transfer as a function of frequency with and without the metamaterials.

FIG. 12 shows a graph comparing efficiencies of energy transfer systems, i.e., the efficiencies 1210 for a system without metamaterials, the efficiencies 1220 for a system with metamaterials of parameters ∈=−1+0.001i, μ=−1+0.001i (NIM), and the efficiencies 1230 for a system with metamaterials of parameters ∈=1, μ=−1+0.001i (MNG metamaterials).

As shown by the graph, the system without metamaterials has a peak efficiency of about 33%. The system with NIMs has a higher peak efficiency of about 40%. The peak efficiency of the system with MNG metamaterials is further increased to about 50%. In the comparison, both NIMs and MNG metamaterials improve the transfer efficiency of the system. While NIMs have loss in both permittivity and permeability, SNG metamaterials have loss in only permittivity or permeability. Having this advantage, higher efficiency is achieved with SNG metamaterials.

Design of Metamaterials

Metamaterials are artificial materials designed to possess properties, such as negative refraction and evanescent wave amplification, not readily available in natural materials. Metamaterials usually gain their properties from a design of a structure of the metamaterials formed by small inhomogeneities with physical size typically much smaller than the dominant wavelength. The inhomogeneities include, but are not limited to, split-ring resonators, LC resonators, multi-turn spirals, and double-side spirals.

The properties of the metamaterials are usually described by macroscopic parameters, such as the electric permittivity and the magnetic permeability, described above. The macroscopic parameters of metamaterials can be changed by changing the design of the structure of the metamaterials. The structures of the metamaterials can be designed by either periodic or aperiodic arrays of the inhomogeneities to form metamaterials of different properties. The structures can be designed to have or not have electromagnetic resonances at the dominant frequencies. Different composite materials, including metals and dielectrics can be used to build the structures of metamaterials.

Isotropic Metamaterials

The isotropic metamaterials have isotropic parameters, i.e., the metamaterials have the same response to a magnetic field or an electric field in directions along different axes. The inhomogeneities of the structure of the isotropic metamaterials are usually arranged in three dimensions.

Figure 13:
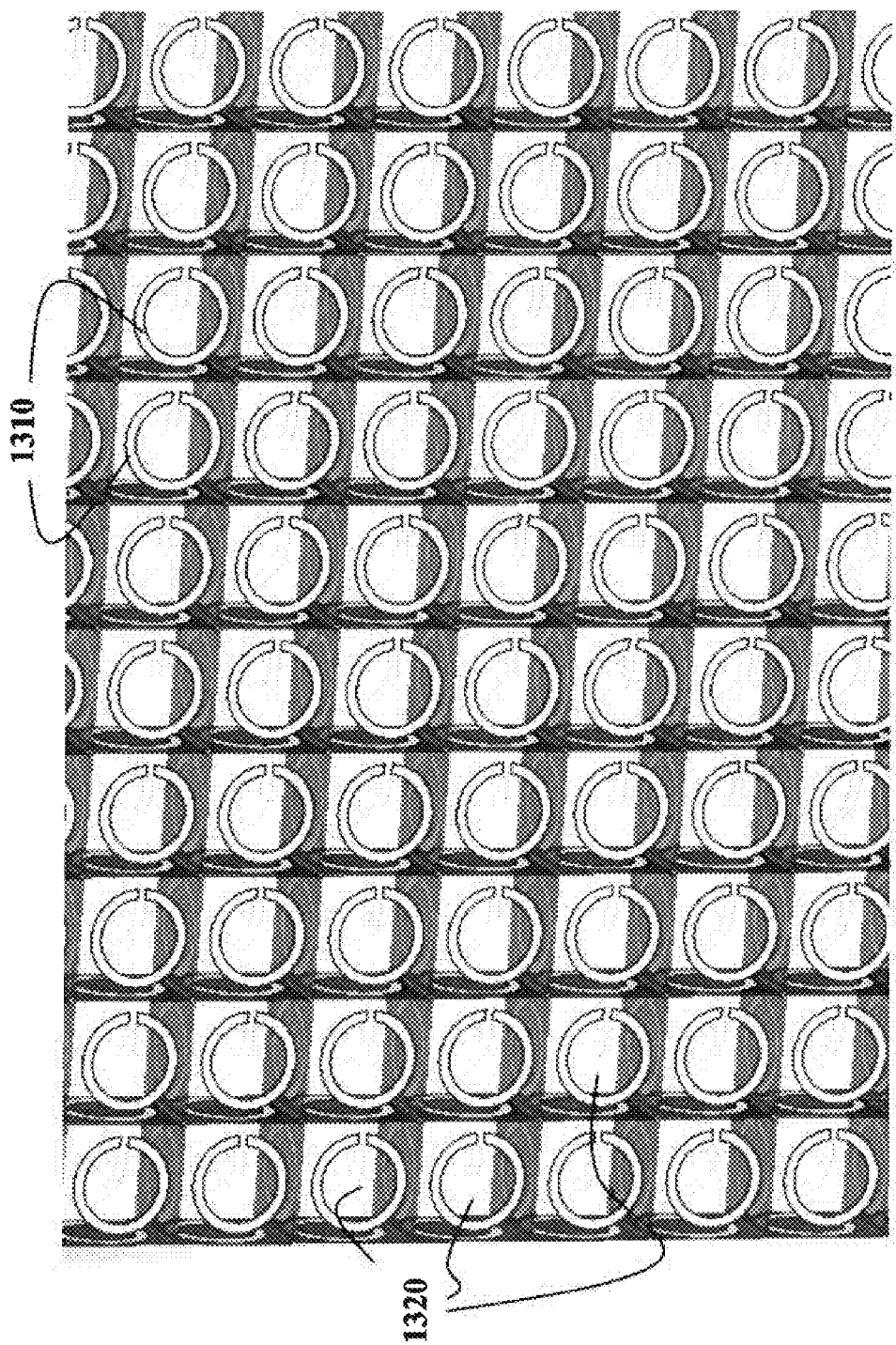
FIG. 13 is an example of an isotropic metamaterial.

FIG. 13 shows an example of the structure of the isotropic metamaterial arranged in three-dimensional cells 1320. In this example, the inhomogeneities are split-ring resonators 1310.

A split-ring resonator (SRR) is a component part of a negative index metamaterial (NIM). A single cell SRR has a pair of enclosed loops with splits in at opposite ends. The loops are made of a nonmagnetic metal. The loops can be concentric, or square, and gapped as needed. A magnetic flux penetrating the metal rings will induce rotating currents in the rings, which produce their own flux to enhance or oppose the incident field. This field pattern is dipolar. Due to splits in the rings, the structure can support resonant wavelengths much larger than the diameter of the rings. The small gaps between the rings produces large capacitance values which lower the resonating frequency is the time constant is large. The dimensions of the structure are small compared to the resonant wavelength. This results in low radiative losses, and very high quality factors.

Anisotropic Metamaterials

In general, anisotropic materials have a difference of a property measured along different axes. A simple example of an anisotropic material is wood, which is easier to split along the grain than across the grain.

The anisotropic metamaterial has one value of the parameter of permittivity, permeability, or both in one direction, and different value of the parameter in other directions. By using the anisotropic metamaterials instead of the isotropic metamaterials, the design and manufacture of the metamaterials can be simplified. In wireless power transfer systems, the anisotropic metamaterials can be used to amplify the evanescent waves in particular directions depending on the system configuration, and achieve improved energy transfer efficiency.

Anisotropic metamaterials can be constructed by different arrangements of the inhomogeneities. In some embodiments, the inhomogeneities are arranged in three dimensions. In other embodiments, the inhomogeneities are arranged in two dimensions. Planar sheets can be constructed with inhomogeneities arranges in two dimensional arrays. The anisotropic metamaterial is constructed by arranging these planar sheets in parallel.

FIG. 14 shows an example of the anisotropic metamaterial 1400. The inhomogeneities 1410 are arranged in two-dimensional arrays to form planar sheets 1420. The planar sheets are arranged in parallel to form the anisotropic metamaterial. The anisotropic metamaterial includes at least one planar sheet, but usually two or more of the planar sheets 1420 and has properties of metamaterial in at least one particular direction 1430. For example, the anisotropic metamaterial 1400 has property of the metamaterial in a direction 1460 perpendicular to the planar sheets. In various embodiments of the inventions, the property of the metamaterial is the property of different kind of metamaterials such as NIM, SNM, ENG, or MNG metamaterials. Also, in various embodiments, the particular direction can be non-perpendicular to the planar sheets, e.g., directions 1440 and 1450, and the anisotropic metamaterial can have property of the metamaterials in more than one direction.

Wireless Power Transfer with Anisotropic Metamaterials

In some embodiments, the electric field or magnetic field of the structure 210 is dominant in one direction. Additionally or alternatively, in some embodiments the structure 210 is configured to transfer the energy in at least one particular direction. It is thus important to have the metamaterials arranged to enhance the EM field strength in this particular direction, and the response to fields in other directions is less critical.

Accordingly, some embodiments of the invention employ the anisotropic metamaterials designed to have different responses for EM fields in different directions. In these embodiments, the anisotropic metamaterial is arranged within the EM near-field of the structure 210 such that an amplitude of the evanescent waves propagating in the particular direction is increased.

Figure 15A:
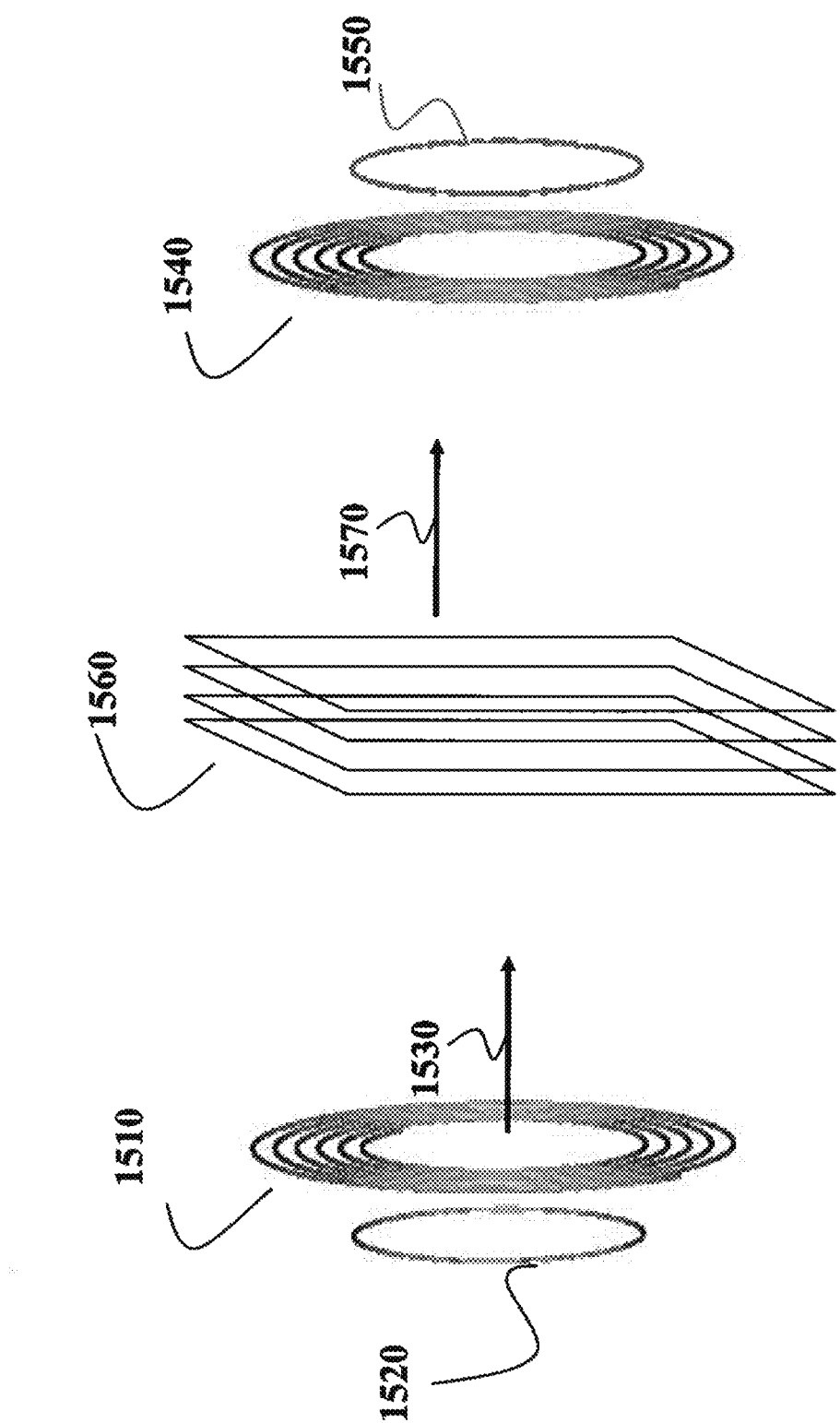

FIG. 15A shows a system 1500 according to another embodiment of the invention. The system 1500 includes a source 1510 configure to transfer energy from a driver 1520 via a coupling of evanescent waves along a first direction 1530. The system 1500 optionally includes a sink 1540 arranged at the distal from the source 1520 along the first direction and configured to receive the energy from the source along the first direction and transfer the received energy to a load 1550.

The system 1500 also includes at least one anisotropic metamaterial 1560 that has a property of metamaterial along a second direction 1570 and arranged within the near-field of the source 1510 or the sink 1540 on the path of the evanescent waves such that an amplitude of the evanescent waves is increased. Specifically, in one embodiment, the anisotropic metamaterial is arranged such that the first direction is aligned with the second direction.

In one variation of the system 1500, the anisotropic metamaterial 1560 is arranged at a distance approximately equal from the source and the sink, or nearer to the source than to the sink. In another embodiment, the anisotropic metamaterial is arranged nearer to the sink than to the source, as shown in FIG. 15B.

Figure 15C:
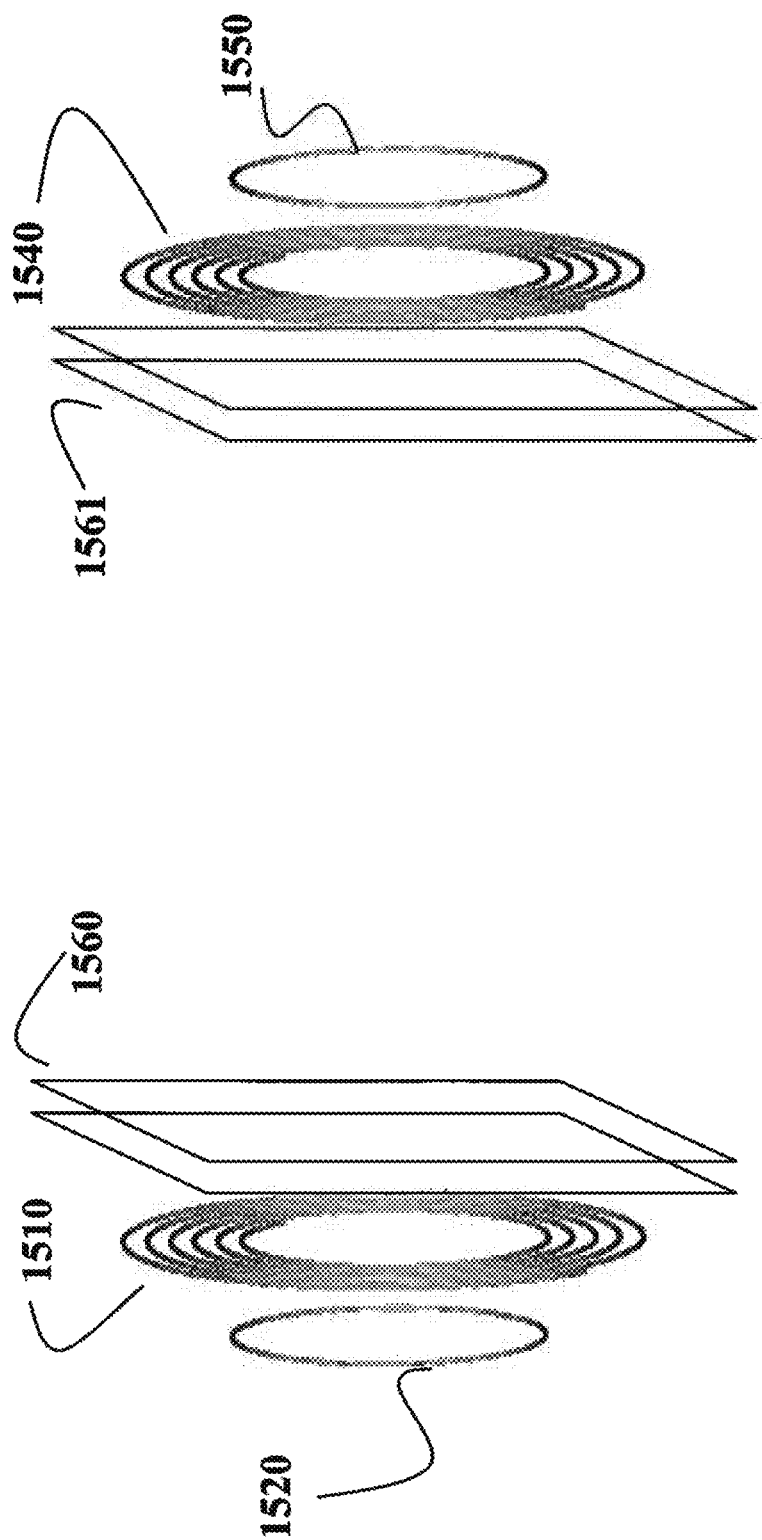

In yet another embodiment, shown in FIG. 15C, a plurality of the anisotropic metamaterials 1560-1561 is arranged on the path of the evanescent waves, such that the evanescent wave travels through each anisotropic metamaterial in the plurality of metamaterials during the coupling. In general, the metamaterial is arranged such that to optimize evanescent waves coupling between the source and the sink during the wireless energy transfer. In various embodiments, the anisotropic metamaterial is implemented as an independent device, or integrated into the source or the sink.

Although the invention has been described by way of examples of preferred embodiments, it is to be understood that various other adaptations and modifications may be made within the spirit and scope of the invention. Therefore, it is the object of the appended claims to cover all such variations and modifications as come within the true spirit and scope of the invention.

We claim:

1. A system configured to exchange energy wirelessly, comprising:
a source and a load exchanging the energy wirelessly via a coupling of evanescent waves along a particular direction, wherein the source and the load are electromagnetic (EM), non-radiative and resonant structures, wherein the coupling between the structures is strong and a strength of the coupling is represented by a coupling coefficient, and wherein dimensions of the structures are smaller than a wavelength of the evanescent waves;
a driver for supplying the energy to the source, wherein the source generates an EM near-field along the particular direction in response to receiving the energy, such that the EM near-field is an electric-dominant and the coupling is an electric-dominant coupling or the EM near-field is a magnetic-dominant and the coupling is a magnetic-dominant coupling; and
an anisotropic metamaterial arranged on the particular direction within the EM near-field of the source, wherein the anisotropic metamaterial is a single-negative (SNG) metamaterial having a type selected from a group consisting of an $\in$-negative (ENG) metamaterial and a $\mu$-negative (MNG) metamaterial, wherein the type is selected to correspond a dominant type of the coupling, such that the SNG metamaterial is the ENG metamaterial if the coupling is the electric-dominant coupling, or the SNG metamaterial is the MNG metamaterial if the coupling is the magnetic-dominant coupling, and wherein a metamaterial property of the SNG metamaterial is aligned with the particular direction such that the coupling coefficient is increased.

2. The system of claim 1, wherein a plurality of anisotropic metamaterials is arranged on a path of an evanescent wave, such that the evanescent wave travels through each anisotropic metamaterial in the plurality of anisotropic metamaterials during the coupling.

3. The system of claim 1, wherein the anisotropic metamaterial has a negative permittivity property and a positive permeability property along the particular direction.

4. The system of claim 1, wherein the anisotropic metamaterial has a positive permittivity property and a negative permeability property along the particular direction.

5. A method of transferring electromagnetic energy wirelessly via a coupling of evanescent waves, comprising steps of:

transferring the energy wirelessly via a strong coupling of evanescent waves along a particular direction, wherein a strength of the coupling is represented by a coupling coefficient, and wherein the coupling is an electric-dominant coupling or a magnetic-dominant coupling; and increasing the strength of the coupling using an anisotropic metamaterial, wherein the anisotropic metamaterial is an ∈-negative (ENG) metamaterial if the coupling is the electric-dominant coupling or a μ-negative (MNG) metamaterial if the coupling is the magnetic-dominant coupling.

6. The method of claim 5, further comprising:

providing a first resonator structure having a first mode with a resonant frequency $\omega_1$, an intrinsic loss rate $\Gamma_1$ and a first Q-factor $Q_1=\omega_1/(2\Gamma_1)$, wherein the first resonator structure is electromagnetic and designed so that $Q_1>100$;

providing a second structure positioned distal from the first electromagnetic resonator structure and not electrically wired to the first resonator structure, the second resonator structure has a second mode with a resonant frequency $\omega_2$, an intrinsic loss rate $\Gamma_2$, a second Q-factor $Q_2=\omega_2/(2\Gamma_2)$, wherein the second resonator structure is electromagnetic and designed so that $Q_2>100$;

arranging the anisotropic metamaterial between the first resonator structure and the second resonator structure, wherein the anisotropic metamaterial has a property of a metamaterial along the particular direction aligned with the particular direction of the energy transfer; and transferring the electromagnetic energy from the first resonator structure through the anisotropic metamaterial to the second resonator structure over a distance D, wherein the distance D is smaller than each of the resonant wavelength $\lambda_1$ and $\lambda_2$ corresponding to the resonant frequencies $\omega_1$ and $\omega_2$ respectively.

7. The method of claim 5, wherein the anisotropic metamaterial has a positive permittivity property and a negative permeability property only along the particular direction.

8. The method of claim 5, wherein the anisotropic metamaterial has a negative permittivity property and a positive permeability property only along the particular direction.

9. The method of claim 5, wherein the anisotropic metamaterial has a negative permittivity property and a negative permeability property only along the particular direction.

10. The method of claim 5, wherein the anisotropic metamaterial is formed by inhomogeneities having dimensions smaller than a wavelength of the evanescent waves.

11. A system configured to exchange electromagnetic energy wirelessly, comprising:

a first resonator structure having a first mode with a resonant frequency $\omega_1$, an intrinsic loss rate $\Gamma_1$ and a first Q-factor $Q_1=\omega_1/(2\Gamma_1)$, wherein the first resonator structure is electromagnetic and designed so that $Q_1>100$;

a second resonator structure positioned distal from the first resonator structure and not electrically wired to the first resonator structure, the second resonator structure has a second mode with a resonant frequency $\omega_2$, an intrinsic loss rate $\Gamma_2$, a second Q-factor $Q_2=\omega_2/(2\Gamma_2)$, wherein the second resonator structure is electromagnetic and designed to have $Q_2>100$; and an anisotropic metamaterial arranged between the first resonator structure and the second resonator structure, wherein the first resonator structure transfers the electromagnetic energy through the anisotropic metamaterial to the second resonator structure via a strong coupling of evanescent waves over a distance D, wherein the distance D is smaller than each of the resonant wavelength $\lambda_1$ and $\lambda_2$ corresponding to the resonant frequencies $\omega_1$ and $\omega_2$ respectively, wherein a dominant type of the coupling is an electric-dominant coupling or a magnetic-dominant coupling, wherein the anisotropic metamaterial is a single-negative (SNG) metamaterial having a type selected from a group consisting of an ∈-negative (ENG) metamaterial and a μ-negative (MNG) metamaterial, wherein the type corresponds to the dominant type of the coupling, such that the SNG metamaterial is the ENG metamaterial if the coupling is the electric-dominant coupling or the SNG metamaterial if the coupling is the magnetic-dominant coupling.

12. The system of claim 11, wherein dimensions of the structure are smaller than each of the resonant wavelength $\lambda_1$ and $\lambda_2$, and wherein the anisotropic metamaterial is the SNG metamaterial only along a direction of energy transfer.

13. The system of claim 12, wherein the anisotropic metamaterial is formed by planar sheets of two-dimensional array of inhomogeneities, wherein the planar sheets are arranged in parallel.

14. The system of claim 13, wherein the planar sheets are arranged such that the direction of the energy transfer is perpendicular to the planar sheets.

* * * * *